VARIABLE WIDTH ADDRESSING ARRANGEMENT

Filed July 15, 1964 2 Sheets-Sheet 1

INVENTORS
WALTER R. LETHIN
MICHAEL H. BLUME
BY Robert J. Zinn
ATTORNEY

VARIABLE WIDTH ADDRESSING ARRANGEMENT

INVENTORS
WALTER R. LETHIN
BY MICHAEL H. BLUME
Robert J. [signature]
ATTORNEY

United States Patent Office 3,331,056

Patented July 11, 1967

3,331,056

VARIABLE WIDTH ADDRESSING ARRANGEMENT

Walter R. Lethin, Canton, and Michael H. Blume, Newton Center, Mass., assignors to Honeywell Inc., Minneapolis, Minn., a corporation of Delaware Filed July 15, 1964, Ser. No. 382,891
9 Claims. (Cl. 340—172.5)

ABSTRACT OF THE DISCLOSURE

An address selection technique for the use in a character oriented data processing system operative with a variable length instruction format and characterized by an ability to utilize a variable number of characters per address field in specifying each memory location. In the implementation thereof, a register defining the number of characters comprising a memory address is preset whereafter the appropriate number of address defining characters may be assembled under the control of the preset register to thereby define an address for use in referencing a memory location.

The present invention is directed to an electronic apparatus for processing data and more specifically to means for addressing a modular-type data processing system memory or the like whereby maximum economy of both memory space and processing time is realized.

The design emphasis of present-day data processing systems is directed to modular-type units in which a variety of operative assemblies of differing size and speed characteristics are provided on a freely interchangeable basis. Thus, starting with a system designed to meet the basic needs of a particular application, additional modules or units may be subsequently added to expand the system to meet added requirements.

One way to vary the size and capability of a modular-type data processing system is to expand the amount of main memory that is associated with the system. Representative functions served by the main memory in a data processing system are the storage of program instructions and data that is to be processed in accordance with the instructions stored. In order that the data processing system may make use of the program instructions and data words stored in the main memory, it must be able to reference or address the storage locations therein. Typically, each storage location in the main memory is assigned one of a series of consecutive numbers or addresses from 0 to the maximum storage capacity of the memory.

As presently practiced, memory address selection circuits are utilized which, in response to a program instruction, provide access to the storage location represented by the address field of the program instruction. In this respect, a program instruction may be considered as comprising two parts. The first part is the operation part or code which specifies the operation to be performed by directing the computer to effect its performance by means of associated control circuits. The second part is the address field which specifies the address or addresses of the operands in main memory which are to be used in the performance of the operation. The operation may, for example, consist of an arithmetic manipulation of the addressed operands, such as multiplication or division, or it may simply involve a conditioning step such as an operand or information transfer or the like.

Each addressable storage location of the memory comprises a number of memory cores for the storage of bits of information. The total number of bits per addressable storage location varies in accordance with whether the machine is word- or character-oriented and, in addition, with the specific mode of implementing the addressing of the main memory.

A program instruction may comprise a plurality of sub-portions, each of which is further comprised of a plurality of bits of information. Most computers operate with a fixed number of these sub-portions in each instruction word or data field. Such machines are word-oriented and, in their design, consideration must be given to ensure that the instruction format is capable of expressing the largest bit representations expected to be encountered. In this respect, it must be remembered that processing time, storage space, and associated hardware will not be efficiently used when the machine is not operative in its fullest capacity. Also, in a word-oriented system, the selection of a word length chosen to most efficiently accommodate the program instructions may result in penalizing the efficiency of processing of the data fields.

The number of bits of information in a program instruction depends, among other things, upon the number of address fields in each instruction, and the size of these address fields. In the compilation of the different programs for the various operating routines, different combinations of numbers and sizes of address fields suggest themselves. However, in word-oriented systems, these suggested combinations will not always be compatible with the operative word length of the system. In order to provide more flexible data processing systems, it has heretofore been proposed to utilize variable length program instructions with the system by providing appropriate control circuitry and related logical organization, as needed, to effect the processing thereof. Such systems may be conveniently implemented by utilizing special character representations selectively combined to form a variable length instruction word. These systems are sometimes referred to as being character-oriented.

In the implementation of a character-oriented system, the processing of an instruction proceeds with the characters being transferred one by one out of successive main memory locations, each of which stores one or more characters. Basic to all instructions is a single-character operation code which defines the fundamental operation to be performed. Most instructions also have two address portions which may be designated as the A address and the B address fields. The information in the address fields may indicate the starting address locations of the operand fields as stored in the main memory. Thus, the information in the address field of an instruction may refer to the address location in main memory of the first character of an operand. The remaining digits of the operand may be stored in successive higher numbered memory locations within the main memory. A variant character may also be included in the instruction format to modify the operation code of the succeeding instruction or instructions to thereby extend the fundamental definitions applied thereby. Appropriate coded bit combinations may also be associated with the operands as stored in the successive memory locations to indicate that the extraction-from-memory phase of the program instruction presently being called from memory has been completed.

It should be noted that as presently practiced, the variable word length concept of character-oriented machines permits a variation in the length of an instruction in accordance with the nature of the operation to be performed; however, as presently practiced, the length of the address fields within the variable format remain fixed. This arrangement imposes certain limitations on the addressing ability of any such system that restricts the expandability of the memory locations that can be made available.

Accordingly, it is a primary object of the present invention to provide a memory address selection circuit which is adapted to operate with a variable number of characters in the address field of selected program instructions.

The ability of a system, constructed in accordance with the principles of the present invention, to operate in response to a two- or three-character address is in part due to the manner in which the address is specified, namely in the form of a straight binary coded digital representation. The significant contribution of straight binary coding concerns the ability to address an entire "bank" of memory utilizing two characters of six information bits each. For purposes of this invention, a memory bank may be considered as comprising a plurality of addressable memory locations equal in number to the possible combinations of the 12 binary coded information bits comprising the two address characters. Although this number may vary from system to system in accordance with the number of bits per character, in this particular example, there are $2^{12}=4,096$ addressable memory locations per bank. Expansion to accommodate additional banks of memory is then facilitated by one or more additional characters wherein the information bits define a particular memory bank.

It is therefore another object of the present invention to provide a memory address selection circuit which is adapted to operate with a variable number of straight binary coded characters in the address field of a controlling program instruction.

A preferred embodiment of the present invention is also provided with means to enter individual characters of information into selective positions of address registers associated with the memory address selection circuitry. This is opposed to prior art techniques in which the plurality of characters constituting the address field are entered into the address registers associated with the memory address selection circuitry as a complete address field. This latter feature is of particular advantage to a system constructed in accordance with the principles of the present invention and which includes an expanded memory, that is, a plurality of memory banks. Such a system would normally require a three-character address field to completely define a memory location; however, in the present system it is possible to operate in the two-character address mode by retaining one or more of the characters previously entered in the address register associated with the memory address selection circuitry thereby conserving memory space and operating time.

Therefore, another object of the present invention is to provide apparatus that has the ability to utilize a variable number of characters of address information and to introduce these independently into selected positions of a memory address selection circuit.

Another object of the present invention is to provide a character-oriented data processing apparatus including an expandable main memory which is readily addressable in any capacity without sacrifice of efficiency, operating speed or memory space.

It is a further and more specific object of this invention to provide a memory address selection circuit for a character-oriented data processing system wherein each address field relating to a program instruction may contain a variable number of characters in proportion to the number of main memory storage locations within the data processing system.

Still another object of this invention is the provision of a new and improved apparatus for implementing the foregoing objects and which apparatus comprises a minimum amount of hardware and is adapted to operate with maximum efficiency of processing time and main memory storage space.

The ability to operate in either a two- or a three-character addressing mode and, more broadly, the ability to operate in an "N" character addressing mode, is dependent upon the design interrelationship of the system components. For purposes of this invention, the designations 2, 3 or N character addressing mode pertains to the ability, in an apparatus operative in accordance with the principles of this invention, to effect the referencing of a particular location within an addressable memory thereof by specifying 2, 3 or N characters even though the 2, 3 or N characters in themselves are not capable of completely defining a memory location because of the physical size of the memory. In this respect, an electronic data processing apparatus constructed in accordance with the principles of the present invention may include an addressable main memory for storing characters of information expressed as a binary coded representation and further includes a plurality of registers operatively connected to the output thereof. A main memory address register connected to the input of the main memory may be provided for referencing a particular location therein in accordance with the digital representation of an address field transferred into the main memory address register. In addition, a control portion may be provided for enabling the main memory address selection circuit to cycle through a particular program instruction. The control portion includes a plurality of multi-character storage registers including a sequence register and at least an A and a B operand register.

Additional means may be provided for initiating the transfer of a digital representation normally stored in the sequence register of the control portion, to the main memory address register. The digital representation transferred into the main memory address register is then incremented and returned to the sequence register. The main memory location, as referenced by the digital representation of the main memory address register, is somewhat simultaneously transferred into the output registers associated with the main memory. The information initially transferred from the main memory is utilized to define an operation to be performed, while other characters of information similarly withdrawn from the main memory are transferred into the A and B operand address registers of the control portion during succeeding cycles for subsequent use in the referencing of main memory locations containing the actual A and B operand information. In a preferred embodiment, means are provided which register an indication of the number of characters to be stored in both the A and B operand address registers of the control portion.

An example of the present invention which enables the addressing of a main memory to proceed in either a two- or three-character addressing mode may be implemented by having available a preset flip-flop which is set or reset in accordance with a program instruction defining a particular mode of operation. Accordingly, as subsequent program instructions are extracted, a check is made as to the status of the preset flip-flop to ascertain which of two possible flowpaths is to be followed. More specifically, after the operation code of a program instruction has been extracted, and the operation identified, the next succeeding character to be extracted is the first character of the A address field. After the first character or upper character of the A address field has been extracted, the preset flip-flop is examined and, if the system is found to be operating in the three-character addressing mode, the middle and lower characters of the A address field are extracted. If, however, upon checking of the preset flop, it is ascertained that the system is operating in a two-character addressing mode, the second or middle character of the A address field is bypassed so that the extraction of the lower character thereof completes the extraction of the A address field. In a similar manner, the successive characters of the B address field are extracted and deposited in a B operand address register of the control portion. Upon extraction of the associated variant character or characters, the extraction phase of the program instruction presently being processed is complete.

The foregoing objects and features of novelty which characterize the invention, as well as other objects of the invention, are pointed out with particularity in the claims annexed to and forming a part of the present specification.

For a better understanding of the invention, its advantages and specific objects attained with its use, reference should be had to the accompanying drawings and descriptive matter in which there is illustrated and described a preferred embodiment of the invention.

Figure 1:
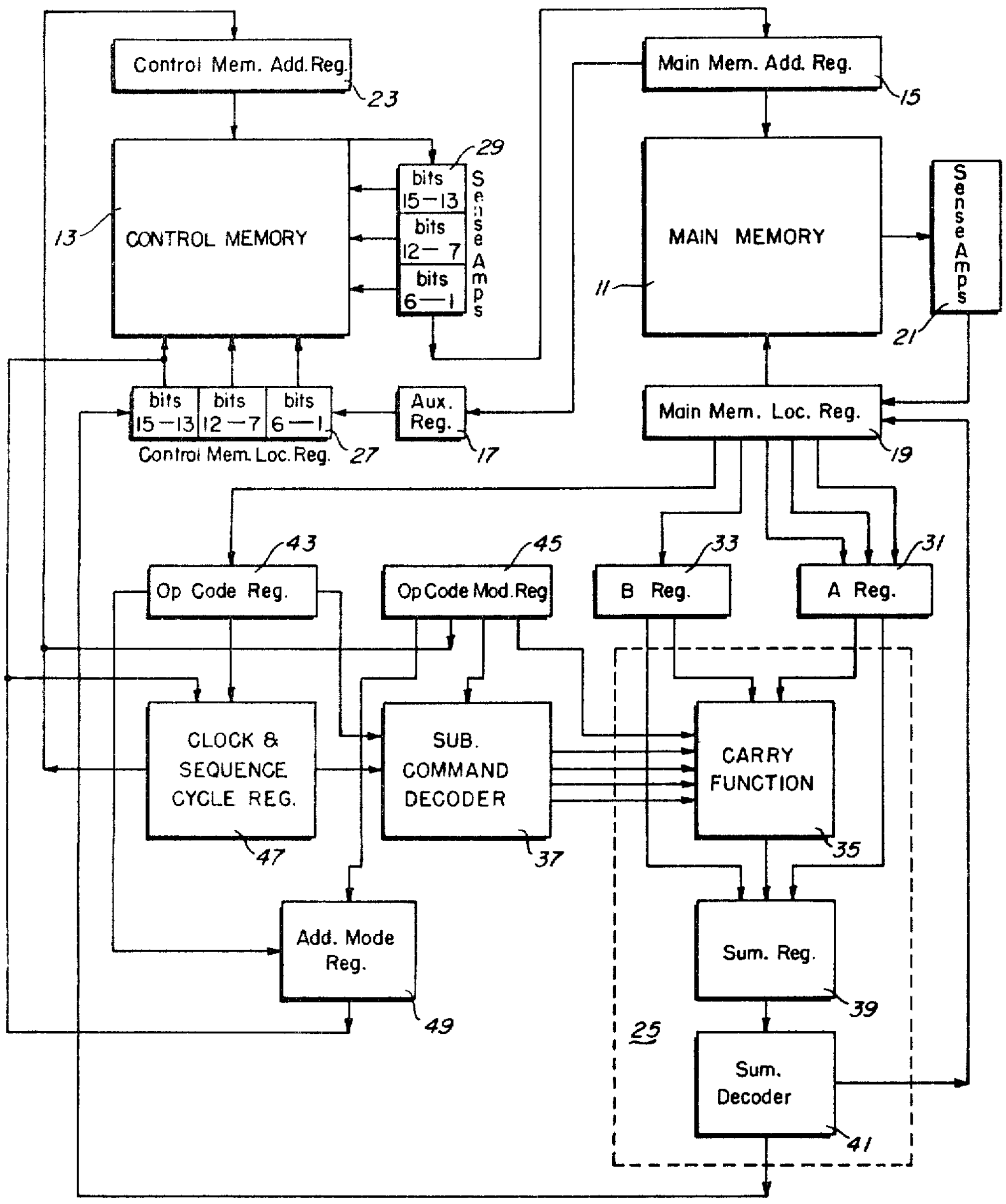
FIGURE 1 is a diagrammatic representation of a data processing apparatus incorporating the principles of the present invention.

Referring first to FIGURE 1, therein is shown a portion of an electronic data processing system constructed in accordance with the principles of this invention and which comprises a central processor including a main memory 11 which may comprise a multi-plane coincident current core storage unit of the form described in the co-pending application of Henry W. Schrimpf filed Jan. 25, 1957, bearing Ser. No. 636,256. Access to the main memory 11 from a control memory 13 may be provided by a multi-stage main memory address register 15 which contains the address of the location within main memory being referenced. Associated therewith is an auxiliary register 17 whose function it is to indicate whether the contents of the main memory address register 15 is to be incremented, decremented or transmitted unchanged to a designated area of the control memory 13. Information enters and leaves the main memory locations addressed by register 15 via a main memory local register 19 which also generates checking information pertinent to the data being brought into memory and rechecks the data as it is withdrawn. The extraction path for the information being withdrawn from main memory 11 is via a bank of sense amplifiers indicated generally as member 21.

The control memory 13 is comprised of a plurality of multi-position storage register each of which stores information pertinent to the processing of various program instructions. In this respect, all the program instructions are processed through the control memory which aids in the selection, interpretation, and execution of these in order. In performing these functions, the control memory 13 coordinates the various activities of receiving data, effecting an inter-memory transfer within the central processor, and transferring processed data to the various peripheral devices.

In a preferred embodiment of the present invention there are included in the control memory repertoire A and B operand address registers, sequence and cosequence registers, and present and starting location registers associated with each of a plurality of read-write channels utilized to communicate between main memory and a plurality of peripheral devices, not shown. The plurality of storage registers comprising the control memory 17 are addressed through a control memory address register 23. Information is transferred into the control memory from either the auxiliary address register 21 or as the output of an adder indicated generally as number 25, by way of a control memory local register 27. In addition, the control memory 13 is capable of transferring any of its stored information into the main memory address register 15 by way of associated sense amplifiers 29.

Both the control memory local register 27 and the sense amplifiers 29 possess multi-character storage facilities including the ability to selectively enter or block characters of information directed to the various storage locations thereof. The significance of the selective processing of characters of information as related to register 27 and the sense amplifiers 29 will be made more apparent in the explanation of the operation of a preferred embodiment of the present invention; however, it may be said that just as these registers are operative to enter information on a character basis, they are also operative to be cleared on a character basis such that information previously stored in combination with newly entered information is capable of completely defining a program instruction.

Reference is now made to the adder portion of FIGURE 1 which is capable of performing both binary and decimal arithmetic. Two operand storage registers 31 and 33 are operatively connected to the input of adder 25 and provide means for storing the A and B operand data during the processing of program instructions. Information enters the A and B operand registers from the main memory local register 19. In this respect, the information entering the A operand register 33 may enter on either of three lines in a straight, 1's, or 9's complemented representation in accordance with the nature of the operation to be performed.

Included in the adder 25 is a carry function portion 35 which effects the selective combination of signals from corresponding stages of the A and B operand register 31 and 33 with carry signals being generated in the four stages thereof by means not shown. This selective combining of signals is effected in accordance with signals generated in an associated subcommand decoder 37 which defines the sequence of activities during the extraction phase of each instruction and further identifies the current operation as being logical or arithmetic in nature.

Output signals from corresponding stages of the A and B operand registers 31 and 33 are combined with signals from the carry function portion in a sum register 39. The output of the sum register 39 is connected to a sum decoder 41 wherein the signal representation is recoded into a decimal notation if the original representation was decimal; while for binary operation, the resultant representation is permitted to bypass the decoder unchanged. Normally, the output of the sum decoder is transferred to the main memory local register 19 for subsequent storage in the main memory 11. For a more detailed explanation of the construction and operation of the adder 25, reference is made of the co-pending application of William J. Maczko and Walter R. Lethin, bearing Ser. No. 376,348, filed June 19, 1964.

Two additional registers 43 and 45 are provided for storing the operation code and the operation code modifier respectively. The operation code, which will hereinafter be referred to more simply as the Op code, defines the fundamental operation to be performed by the instruction. The Op code modifier, or variant character, is used to extend the definition supplied by the Op code.

Also provided is a special clock and sequence cycle register 39 which is activated whenever the central processor is engaged in the processing of program instructions or other central processor orders. The clock and sequence cycle register 47, together with the Op code register 43 and the Op code modifier 45 are connected to the subcommand decoder unit 41 which, as explained above, defines the sequence of activities within the adder 25. Connected to outputs from both the Op code and the Op code modifier registers 43 and 45 is an address mode register 49. The function of the address mode register is to store an indication depicting the processing as proceeding in either a two- or three-character addressing mode. In its most elemental form, the address mode register may comprise a single flip-flop; however, by merely enlarging the storage capacity through additional stages, it is possible to indicate which of N possible modes the processing is proceeding in.

In a preferred embodiment of the present invention, the processing of data and instructions proceeds on a character basis with a single multi-bit character being transferred from main memory during each memory cycle interval. In any programmed operation, the first step is to remove from memory the next instruction to be processed. Thus, as an instruction is processed, the characters of the instruction are transferred one by one out of successive main memory locations into the various operational registers of the central processor and control memory. A typical program instruction may include as few as one character or as many as ten or more depending upon the type of instruction and the mode of addressing.

Figure 2:
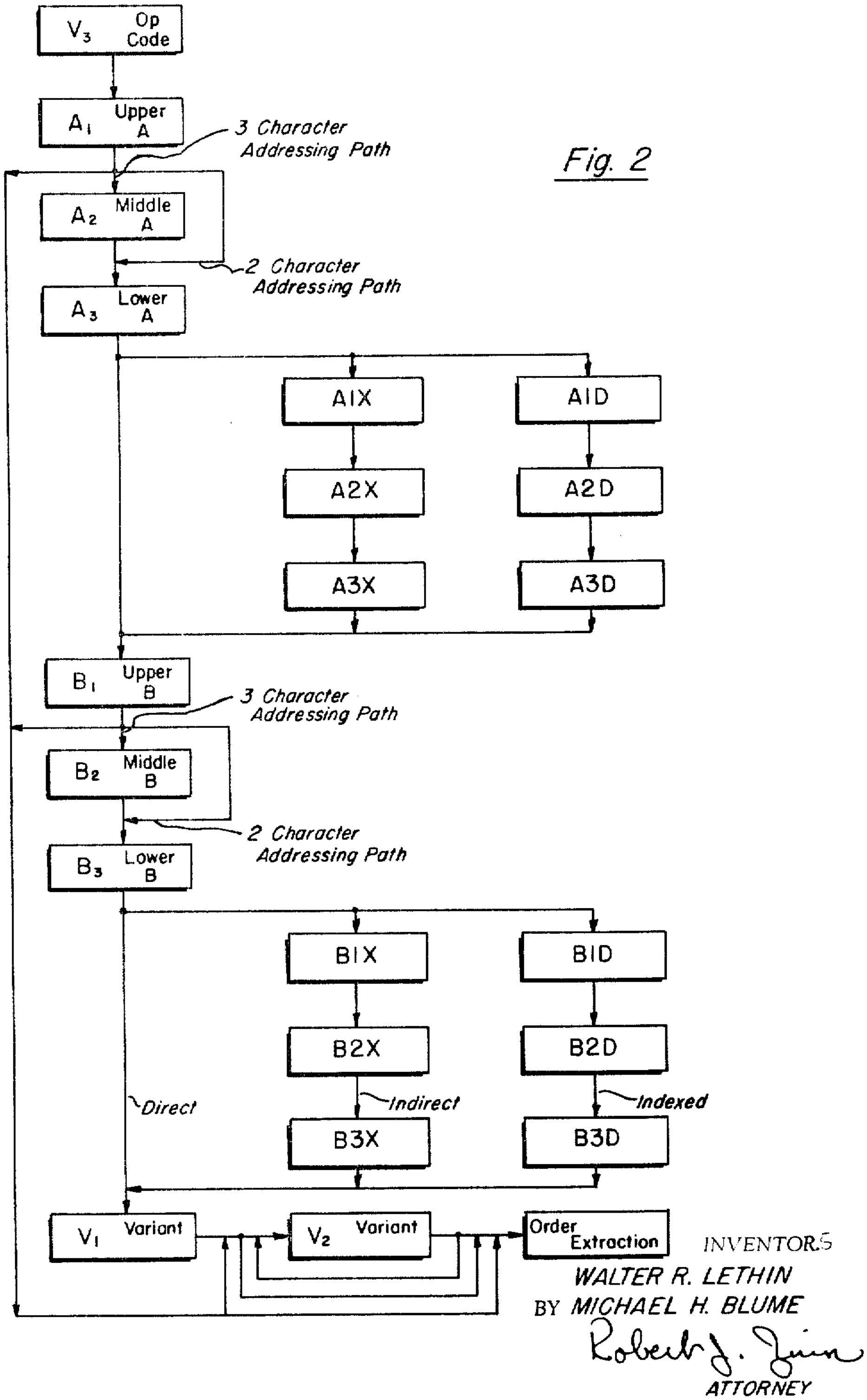
FIGURE 2 is a diagrammatic representation depicting the various flowpaths corresponding to the extraction of program instructions during subsequent operating cycles.

The processing of an instruction involving arithmetic or logical operations occurs in two operative steps; namely, the characters of the instruction are first extracted from main memory whereafter the data identified by the extracted characters is operated upon. Reference is now made to FIGURE 2 which discloses a flowchart depicting the memory cycles as allocated to the processing of the various characters of a program instruction during the extraction phase thereof. More specifically, the extraction phase of a program instruction is initiated with the contents of a location in main memory as specified by the sequence register of the control memory 13, being extracted therefrom and identified as the Op code character indicated herein as V3. This is followed by the processing of a character A1; whereafter it is established whether the operation is to proceed in a two-character or three-character addressing mode. If the operation is to proceed in a two-character addressing mode, the flowpath bypasses character A2 and jumps immediately into the processing of character A3. Alternatively, if the system is operating in the three-character addressing mode, the flowpath continues through the characters A2 and A3 whereupon a test for direct, indirect, or indexing mode is effected. Accordingly, the flowpath continues through A1*x*, A2*x* and A3*x* if operating in the indexed mode and A1*d*, A2*d* and A3*d* if operating in the indirect mode.

In a similar manner, characters B1, B2 and B3 are brought out and tested for the above conditions and the corresponding flowpath followed. The variant characters V1 and V2, as well as any additional variant characters, are subsequently brought out to complete the extraction phase.

Reference is now made once more to FIGURE 1, which is utilized in further explanation of the extraction cycles effected during each of the above-identified time phases. Thus, the extraction of the Op code character is initiated with the information contained in the bit locations one through fifteen of the sequence register of control memory 13 being transferred through associated ones of the sense amplifiers 29 into corresponding stages of the main memory address register 15; whereupon, the information located in the main memory 11 is transferred through the associated sense amplifier 21 to the main memory local register 19. After effecting the information transfer from the main memory 11, the digital representation within the main memory address register 15 is incremented in the auxiliary register 17 and subsequently reloaded into the sequence register of the control memory 13 to thereby identify the location in main memory of the succeeding character of the program instruction to be extracted.

The succeeding character, identified by the previously incremented representation as stored in the sequence register of the control memory 13 proves in the general instance to be the upper character of the A operand address field. Assuming the operation to be in the three-characters-per-address mode of addressing, the digital representation is transferred from the sense amplifiers 29 associated with the control memory 13 and entered into the main memory address register 15 to initiate the extraction from main memory of the information pertaining to the upper character of the A operand. The information stored in the addressed location of main memory 11 is transferred through the main memory sense amplifiers 21 into the main memory local register 19. This information is in turn temporarily stored in the Op code modifier register 45, the upper three bits of which indicate whether the type of addressing to be followed in the processing of the current program instruction is direct, indirect or indexed.

Normally, the address portion of an instruction specifies the address of a particular data field in the main memory. This manner of addressing a data field is referred to as direct addressing. In some instances it is more useful to be able to specify the storage location of another address which in turn specifies the location of a desired data field. This second manner of addressing is referred to as an indirect addressing. The third manner of addressing is indexing in which the contents of an index register are automatically added to an address field in the instruction.

The information stored in the addressed location of main memory 11 is also retained in the B operand register 33 for transmission during the subsequent operative cycle to the control memory local register 27. Somewhat simultaneously, the information previously stored in the main memory address register 15 is incremented and returned to the sequence of the control memory 13.

Referring once more to the flowchart of FIGURE 2, it is seen that at this time, the address mode register 49 is scanned to ascertain whether the addressing is proceeding in the two- or three-character mode; that is, whether the information entered during the A1 cycle is actually the upper character of the A operand address or the middle character thereof. According to the results of the scanning operation, the information presently in the control memory local register 27 is transferred as is into the bit locations corresponding to the middle character of the A address register of the control memory 13 or the low order three bits thereof depicting the upper A operand character are transferred into the corresponding bit locations of the A address register. If the operation were being processed in the two-character addressing mode, the memory cycle normally allocated to the extraction of the A2 character is allocated instead to the extraction of the A3 character, whereafter the succeeding available memory cycle subinterval is utilized to effect the extraction of the B1 operand character.

If, as has been assumed in the present instance, the operation is proceeding in the three-character addressing mode, the characters A2 and A3 are extracted during succeeding memory cycle subintervals whereafter the information transferred into the Op code modifier register 45 during the A1 cycle is scanned to ascertain whether the processing is in the direct, indirect or indexed mode. If direct addressing is used, the succeeding operative cycle is allocated to the extraction of the B1 character while for indirect addressing, the processing will proceed with the extraction of characters A1*d*, A2*d* and A3*d* during succeeding available memory cycle subintervals and indexed addressing will proceed with the extraction of the A1*x*, A2*x* and A3*x* characters during corresponding time intervals. Indexed addressing may be performed by appending to the address being modified a code to indicate which one of a plurality of reserved storage locations in the main memory 11 is to be used. In a similar manner, an indirect address specifies the leftmost character of a field containing another address.

Means are provided to ensure that either the information corresponding to the middle character bit positions of the A operand address information or that of the lower three bits of the upper A operand address are entered into the corresponding bit positions of the A address register of control memory 13. According to the determination made at this point, the succeeding operative cycle will be devoted to the extraction of the bit representation corresponding to the middle or lower A operand address character. In either event, the address of the location within main memory containing the pertinent information is transferred from the sequence register of the control memory 13 through its associated sense amplifiers 29 and into the main memory address register 15; where, after addressing of the main memory 11 has been effected, the information contained within the main memory address register is incremented and returned to the sequence register of the control memory 13.

In the processing of a program instruction wherein the general format involves both A and B operand address fields, the succeeding memory cycle subintervals will be used in the extraction of the B operand address information in a manner similar to that outlined above for the extracting of the A operand address information as indicated on the flowchart of FIGURE 2. Subsequent to the extraction of the A and B operand address information, the variant characters V1 and V2 are processed to complete the extraction phase of the operative instruction. With respect to the extraction of the variant characters, the data contents of the location in main memory 11 as specified by the sequence register of control memory 13, as incremented, are transferred to the Op code modifier register 45. An important characteristic of the preferred embodiment of the present invention concerns its ability to process an instruction having an indefinite number of variant characters. In addition, the system is designed to retain the last variant character processd. These defining characteristics are of particular advantage in effecting the efficient processing in a program instruction as is explained more fully below.

As mentioned above, the address mode register 49 of FIGURE 1 is set by a program instruction, the format of which appears as *F*/*V*. With reference to FIGURES 1 and 2, it is seen that as the Op code or V3 character is extracted from main memory, it is deposited in the Op code register 45. More specifically, the contents of the sequence register of the control memory 13 are transferred through the associated sense amplifiers 29 into the main memory address register 15. This information specifies a particular location in main memory from whence the information stored therein is transferred through the associated sense amplifiers 21 into the main memory local register 19 for subsequent transmission to the Op code register 45. After the Op code character has been extracted from main memory, the contents of the main memory address register 15 are incremented and returned through the control memory local register 27 to the sequence register of the control memory 13.

In accordance with the format outlined above for the change address mode instruction, the A and B extraction cycles are bypassed. However, in accordance with the flowchart of FIGURE 2, the next scheduled cycle following the extraction of the Op code is the A1 cycle which occurs during the extraction phase of each programmed instruction; however, since in the processing of the A address mode instruction, the A and B extraction cycles are bypassed, the succeeding character to be extracted in the processing of this instruction is the variant character. Accordingly, the variant character is brought out of the sequence register during the cycle normally designated A1. During this time cycle, the information within the sequence register of the control memory 13 is transferred to the main memory address register 15 and the information stored in the location of the main memory 11 so addressed is transferred through the associated sense amplifiers 21 into the main memory local register 19 from whence it is transferred to the A operand register 33 and ultimately to the Op code modifier register 45. After processing the variant character, the sequence of cycles as shown in the flowchart of FIGURE 2 is followed with a reinsertion into the main traffic flowpath thereof being effected at the V2 cycle level.

During the processing within the V2 time cycle in a change mode instruction, the information within the sequence register of the control memory 13 prior to its transfer to the main memory address register is detected as having the characteristic end instruction punctuation associated therewith. This special punctuation is designated a word mark and in this instance indicates that the character presently in the sequence register is actually the Op code of the next instruction, thereby establishing that the extraction phase of the present instruction is complete.

The execution phase of the change address mode instruction is effectively completed by the processing of what is essentially a blank cycle wherein the information contained in the sequence register of the control memory 13 is transferred into the main memory address register 15, incremented, and returned to the main memory local register associated with the control memory, however, the incremented transfer is prevented from being restored into the sequence register of the control memory. Since the sequence register of the control memory 13 was not incremented, and since it previously contained the Op code of the succeeding instruction, the information pertinent to the processing of the succeeding instruction will remain in the sequence register pending the completion of the execution phase of the present instruction.

During the execution of the "blank" cycle, no information transfer from the main memory is attempted. However, in a system operative in either the two-or three-character addressing mode, a particular bit of the variant character as stored in the Op code modifier register 45 is sensed and the results thereof utilized to set the associated flip-flop of the address mode register 49 to a particular one of its bistable conditions. During the processing of a subsequent program instruction, the flip-flop associated with the address mode register 49 indicates whether the program is proceeding in a two- or three-character address mode and continues to do so after the extraction and execution portions of the change address mode instruction have been processed. Although the above implementation has been discussed for alternative two- or three-character addressing modes, it is obvious that an extension of the basic concept to a four-, five- or N-character addressing technique would be facilitated by sending an appropriate number of bit positions in the variant character and setting or resetting corresponding flip-flops accordingly.

It has already been noted that a particular characteristic of the present invention concerns its ability to write information into the control memory on a character basis rather than as an address field of fixed length. It is this latter characteristic which enables the implementation of the variable number of characters per address technique when the principles of this invention are employed in an expanded memory; that is, a memory in which it is not possible to completely define a single storage location utilizing just the number of bits available in the two characters of address information. In this respect, the interpretation to be given to the bit representation of the A and B addresses is dependent upon whether the system is operating in the two- or three-character addressing mode. When operating in the two-character addressing mode, the interpretation extended to the high- and low-order characters of an address is that of a continuous 12-bit binary coded number. However, a three-character address field is interpreted as comprising 18 binary bits in which the 15 lower order bits represent a location in main memory while the upper three bits pertain to the manner of addressing, that is, whether it is direct, indirect, or indexed. The lower order 15 bits may be further interpreted as consisting of an upper three bits which identify a particular bank of memory and twelve low-order bits representing a particular location in the memory which is compatible with that defined by the twelve bits available in the two-character mode. For purposes of the invention, a memory bank may be thought of as comprising the plurality of memory locations addressable by a 12-bit binary coded representation.

Consider now the processing of a series of instruction wherein all the characters of the A operands are stored in a first memory bank and all the characters of the B operands are stored in a second memory bank. By associating a particular bank of memory with the A operand address information, and a second bank of memory with the B operand address information, it is possible to effect the referencing of the A and B operand storage locations in main memory in a two-character mode even though the operation is to proceed in an expanded memory. To effect this operation, processing is initiated in the three-character addressing mode and the bit positions within the A and B address registers of control memory 13 corresponding to the high-order character of the A and B operands are preloaded with information which individually defines the respective memory banks associated with the A and B operands, whereafter, the change of address mode flip-flop is set so that the system continues to operate in the two-character addressing mode.

Thus, in the processing of a binary add instruction, the information first extracted from the sequence register of the control memory 13 specifies the location in main memory of the middle character of the A operand address. This, together with the low order A operand address, is entered into the A address register of the control memory 13. Since the upper three bits of the A address register, which identify a particular memory bank, have been prestored, the information currently in the A address register is sufficient to completely define the location in main memory which contains the A operand. In a similar manner, the information identifying the address of the B operand is extracted from main memory and loaded into the B address register within the control memory 13 which already has registered in the upper three-bit positions thereof information identifying the particular bank of memory associated with the B operand. The execution of the binary add instruction proceeds in accordance with the mode of operation outlined above with the information stored in the A and B address registers of the control memory 13 being utilized in turn to load the associated A and B operand registers 31 and 33, whereafter the resultant sum of the binary add operation will be generated within the adder 25 and reloaded into the storage location of the main memory previously occupied by the B operand. In this manner, the succeeding instructions of the series currently being processed may continue to be processed utilizing the two characters per address mode of operation thereby effecting a substantial savings in processing time equivalent to two memory cycle intervals per operation.

Another distinguishing characteristic of the data processing apparatus constructed in accordance with the principles of the present invention concerns the ability to process an instruction having an indefinite number of variant characters as well as the ability to retain the last variant character processed. This ability enables the programmer to place two instructions back to back such that the information of one may be efficiently used in processing the other. More specifically, a binary add operation to be followed by a logical substitute order might find the instruction format as follows:

$$F/A/B/V_1/V_2/\ \ldots\ V_n$$
$$F/V$$

Since the last variant character $V_n$ will be retained in the Op code modifier register 45, this character may be utilized as the variant character of the substitute order which is to follow. Having extracted the variant character with those characters of the binary add instruction, this character will be stored in the Op code modifier register when the Op code of the logical substitute order is extracted. Provided that a particular punctuation bit, namely a word mark, occurs with the character succeeding the Op code of the logical substitute instruction, the previously stored variant character will be interpreted as pertaining to this instruction. Accordingly, a savings of five memory cycle subintervals will be realized when operating in the two-character mode and a savings of seven memory cycle subintervals will be realized when the operation is effected in the three-character mode.

While, in accordance with the provisions of the statutes, there have been illustrated and described the best forms of the invention known, it will be apparent to those skilled in the art that changes may be made to the apparatus described without departing from the spirit of the invention as set forth in the appended claims and that, in some cases, certain features of the invention may be used to advantage without a corresponding use of other features.

Having now described the invention, what is claimed as new is:

1. A memory address selection circuit for processing successive characters of a program instruction within a character oriented stored program type data processing apparatus adapted to operate with a variable length instruction format having a plurality of address fields and including the capability of operating in either a two- or a three-character addressing mode comprising, a memory portion for storing programming data, an address register for referencing a particular location within said memory portion, a plurality of registers operatively connected to the output of said memory portion, a control portion comprising a plurality of multi-character storage registers, means including said control portion for controlling said memory address register so as to enable said data processing apparatus to advance through a sequence of operations in accordance with a particular program instruction, and resettable storage means associated with said control means to indicate whether said two or three character addressing mode applies to the processing of said particular program instruction.

2. A memory address selection circuit for processing successive characters of a program instruction within a character oriented stored program-type data processing apparatus adapted to operate with a variable length instruction format having a plurality of address fields and including the capability of operating in any one of N addressing modes comprising, a main memory for storing programming data, an address register connected to the input of said main memory for referencing a particular location therein, means including a control portion for controlling said main memory address register so as to enable said data processing apparatus to advance through a sequence of memory referencing operations in accordance with said particular program instruction, said control portion further comprising a plurality of multi-character storage registers, resettable storage means adapted to be set in any one of a plurality of states to indicate which of said N possible character addressing modes said data processing system is operative in during the processing of said particular program instruction, and means including sensing means for referencing said resettable storage means so as to ascertain the number of characters to be read into successive positions of said referenced control portion register.

3. In a memory address selection circuit for use in a data processing apparatus operative on a character oriented basis and having a variable length instruction format characterized by a plurality of variable length address fields, the combination comprising a source of characters of information each character being expressed as a digital representation comprising a plurality of bits having two mutually exclusive states, a control portion including a plurality of multi-character storage registers, means to reference a particular one of said storage registers and to load characters of information from said source into successive character positions of said particular storage register, means including resettable storage means adapted to be set in a first or a second state in accordance with whether said system is to operate in a two- or a three-character addressing mode, and sensing means for referencing said resettable storage means and for transferring two characters of information from said source to said referenced storage register when said resettable storage means is in said first state and for transferring the first three characters from said source of information into said referenced storage register when said resettable means is in said second state.

4. A memory address selection circuit for a data processing apparatus adapted to process program instructions on a character oriented basis in any one of N character addressing modes comprising, a memory portion for storing characters of information comprising program instructions and data, an address register adapted to reference each location of said memory portion for each character of information extracted, a control portion for controlling said memory address register so as to enable said data processing apparatus to adavnce through a sequence of memory referencing operations in the processing of a program instruction, and resettable storage means associated with said control portion to indicate which of said N possible addressing modes applies to the processing of said particular program instruction.

5. In a main memory address selection circuit for a data processing apparatus adapted to process program instructions on a character oriented basis wherein each of said program instructions may be expressed in terms of a variable length format comprising a plurality of address fields each of the latter being expressable in terms of up to N characters, the combination of an addressable memory serving as a source of stored information, said stored information further comprising respective characters of program instructions and data, a control portion, said control portion further comprising a plurality of multi-character storage registers, means for selectively referencing a particular one of said plurality of multi-character storage registers and for transferring characters of information between said addressable memory and said referenced storage register, resettable storage means including sensing means adapted to be set in a particular one of a plurality of states so as to indicate that the memory address selection circuit is operative in a particular addressing mode, and means including said sensing means responsive to the state of said resettable storage means to effect the transfer of a corresponding number of characters of information from said source into said referenced storage register.

6. A memory address selection circuit for use in a character oriented data processing apparatus of the stored program type wherein the respective program instructions are characterized by a variable length format including the ability to independently vary the number and length of the address fields to thereby enable said apparatus to operate in any one of N character addressing modes comprising, a main memory for storing program instructions and data, an address register for referencing a particular location within said main memory, a plurality of registers operatively connected to the output of said main memory, resettable storage means connected to the output of at least one of said plurality of main memory output registers and adapted to be set in any one of a plurality of states to indicate which of said N possible character addressing modes said address selection circuit is presently operative in, and means including sensing means for referencing said resettable storage means so as to ascertain the number of characters to be gated to successive character storage stages of a particular control portion register.

7. A memory address selection circuit for processing successive characters of a program instruction within a stored program-type data processing apparatus adapted to operate in a character oriented mode so as to enable the use of a variable length instruction format including one or more address fields, each of said characters being capable of being addressed in either a two- or three-character mode comprising a memory portion for storing programming data, an address register connected to the input of said memory portion for referencing a particular location therein, a control portion for enabling said memory address selection circuit to cycle through a particular program instruction, said control portion further comprising a plurality of multi-character registers, means for referencing a particular one of said control portion registers and for transferrring information into and out of a predetermined number of said plurality of character positions, resettable storage means adapted to be set in a first or a second state in accordance with whether said system is to operate in a two- or a three-character addressing mode respectively, and sensing means for referencing said resettable storage means and for transferring two characters of information into successive character positions of said referenced control portion register when said resettable storage means is in said first state and for transferring three characters of information into successive character positions of said referenced control portion register when said resettable storage means is in said second state.

8. A main memory address selection circuit for processing successive characters of a program instruction within a stored program-type data processing apparatus organized on a character oriented basis wherein the means for referencing each character of said program instruction is adapted to operate in any one of N character addressing modes comprising, a main memory for storing characters of information with each character being expressed as a digital representation comprising a plurality of bits having two mutually exclusive states, a plurality of registers operatively connected to the output of said main memory, a main memory address register connected to the input of said main memory, a control portion for enabling said main memory address selection circuit to cycle through a particular program instruction, said control portion further comprising a plurality of multi-character storage registers including a sequence register and at least one operand address register, means for initiating the transfer of a digital representation normally stored within said sequence register to said main memory address register so as to reference a particular location within said main memory, means for incrementing the digital representation as transferred to said main memory address register and for restoring said incremented digital representation to said sequence register, means for selectively transferring characters of information from referenced main memory locations to the various main memory output registers and to said at least one operand address register, resettable storage means adapted to be set in any one of a plurality of states to indicate which of said N possible character addressing modes said address selection circuit is presently operative in, and means including sensing means for referencing said resettable storage means so as to control the number of characters being gated through successive character storage stages of said at least one operand address register.

9. A main memory address selection circuit for processing successive characters of a program instruction within a stored program-type data processing apparatus adapted to operate in a character oriented mode so as to enable the use of a variable length instruction format including one or more address fields, each of said characters being capable of being addressed in either a two- or a three-character addressing mode comprising, a main memory for storing characters of information expressed as a digital representation comprising a plurality of bits having two mutually exclusive states, a plurality of registers operatively connected to the output of said main memory, a main memory address register connected to the input of said main memory, a control portion for enabling said main memory address selection circuit to cycle through a particular program instruction, said control portion further comprising a plurality of multi-character storage registers including a sequence register and A and B operand address registers, means for initiating the transfer of a digital representation normally stored within said sequence register to said main memory address register so as to reference a particular location within said main memory, means for incrementing the digital representation as transferred to said main memory address register and for restoring said incremented digital representation into said sequence register, means for selectively transferring characters of information from referenced main memory locations to the various main memory output registers and to said A and B operand address registers, resettable storage means adapted to be set in a first or a second state in accordance with whether said system is to operate in a two- or a three-character addressing mode respectively, and sensing means for referencing said resettable storage means and for enabling the transfer of two characters of information into successive character positions of said A operand storage register when said resettable storage means is in said first state and for enabling the transfer of three characters of information into successive character positions of said A operand storage register when said resettable storage means is in said second state.

References Cited

UNITED STATES PATENTS

| | | | |
|---|---|---|---|
| 2,962,213 | 11/1960 | Namian | 235—157 |
| 3,200,380 | 8/1965 | MacDonald et al. | 340—172.5 |
| 3,223,982 | 12/1965 | Sacerdoti et al. | 340—172.5 |
| 3,275,989 | 9/1966 | Glaser et al. | 340—172.5 |

ROBERT C. BAILEY, *Primary Examiner.*

R. RICKERT, *Assistant Examiner.*